US012631991B2

(12) United States Patent
Waida et al.

(10) Patent No.: US 12,631,991 B2
(45) Date of Patent: May 19, 2026

(54) IMAGE FORMING APPARATUS AND NON-TRANSITORY COMPUTER READABLE MEDIUM STORING IMAGE FORMING PROGRAM FOR SHORTENING TIME PERIOD FROM RECEPTION OF PRINT INSTRUCTION TO IMAGE FORMATION

(71) Applicant: FUJIFILM Business Innovation Corp., Tokyo (JP)

(72) Inventors: Eiichi Waida, Kanagawa (JP); Takumi Nishikata, Kanagawa (JP); Yusuke Chika, Kanagawa (JP); Kazunobu Uchiyama, Kanagawa (JP); Hideo Kimura, Kanagawa (JP); Yuzo Fujita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/190,054

(22) Filed: Mar. 24, 2023

(65) Prior Publication Data

US 2024/0085826 A1 Mar. 14, 2024

(30) Foreign Application Priority Data

Sep. 13, 2022 (JP) ................................ 2022-145650

(51) Int. Cl.
*G03G 15/16* (2006.01)

(52) U.S. Cl.
CPC ................................ *G03G 15/1605* (2013.01)

(58) Field of Classification Search
CPC ........... G03G 15/0189; G03G 15/1605; G03G 15/5016; G03G 2215/00021
See application file for complete search history.

(56) References Cited

U.S. PATENT DOCUMENTS

| | | | | |
|---|---|---|---|---|
| 2007/0081828 | A1* | 4/2007 | Radulski ............ | G03G 15/6529 399/27 |
| 2011/0075165 | A1 | 3/2011 | Hayakawa | |
| 2015/0181058 | A1 | 6/2015 | Adachi | |
| 2018/0060002 | A1 | 3/2018 | Hosomi | |
| 2018/0129456 | A1 | 5/2018 | Okamoto et al. | |
| 2021/0373816 | A1 | 12/2021 | Nishikata et al. | |

FOREIGN PATENT DOCUMENTS

| | | |
|---|---|---|
| JP | 2006078692 | 3/2006 |
| JP | 2008065788 | 3/2008 |

OTHER PUBLICATIONS

"Search Report of Europe Counterpart Application", issued on Feb. 6, 2024, p. 1-p. 8.
"Office Action of Europe Counterpart Application", issued on Oct. 1, 2025, p. 1-p. 8.

* cited by examiner

*Primary Examiner* — Hoang X Ngo
(74) *Attorney, Agent, or Firm* — JCIPRNET

(57) ABSTRACT

An image forming apparatus includes plural image forming units including plural image forming sections and an intermediate transfer body to which a toner image formed on the plural image forming sections is primarily transferred, and a processor, in which the processor is configured to, in a case where a printing instruction is received in a state in which an image forming section having a combination of identical colors is set for each of the plural image forming units, execute the printing instruction by using an image forming unit that is in a state in which image formation is able to be executed among the plural image forming units.

7 Claims, 10 Drawing Sheets

IMAGE FORMING APPARATUS AND NON-TRANSITORY COMPUTER READABLE MEDIUM STORING IMAGE FORMING PROGRAM FOR SHORTENING TIME PERIOD FROM RECEPTION OF PRINT INSTRUCTION TO IMAGE FORMATION

CROSS-REFERENCE TO RELATED APPLICATIONS

This application is based on and claims priority under 35 USC 119 from Japanese Patent Application No. 2022-145650 filed Sep. 13, 2022.

BACKGROUND

(i) Technical Field

The present invention relates to an image forming apparatus and a non-transitory computer readable medium storing an image forming program.

(ii) Related Art

The following JP2008-065788A discloses an image forming apparatus in which, in a case where a printing unit of an own machine is out of order in a case where image information and a printing command are given, another machine in which a printing unit is not out of order is found, image data is transmitted, and an instruction for printing is given.

The following JP2006-078692A discloses an image forming apparatus that reduces a delay time until image formation is started. In this image forming apparatus, in a case where an image formation instruction is input, first, an image forming unit is started to be driven as an initial process speed at a process speed at which a first print time or a first copy time is shortest. After that, the input image formation instruction is analyzed, a process speed appropriate for the image formation instruction is determined, and the image forming unit is driven at the determined process speed to perform actual image formation.

SUMMARY

In an image forming apparatus provided with a plurality of image forming units having intermediate transfer bodies to which a toner image formed by a plurality of image forming sections is primarily transferred, a toner image of each intermediate transfer body of the plurality of image forming units is secondarily transferred to a recording medium such as printing paper such that an image is formed. In such an image forming apparatus, an image forming section having a combination of identical colors may be set and used for each image forming unit.

In such a case, in a case where image formation is performed by using a preset image forming unit, a state in which image formation cannot be executed may occur because the image forming unit is executing image adjustment or the like. Alternatively, the image forming unit may be in a state in which image formation cannot be executed after a printing instruction is given. In that case, it takes a long time until an image is formed after a printing instruction is given.

Aspects of non-limiting embodiments of the present disclosure relate to an image forming apparatus and a non-transitory computer readable medium storing an image forming program capable of reducing a time until an image is formed after a printing instruction is received compared with a case where an image is formed by using a preset image forming unit in the image forming apparatus provided with a plurality of image forming units having a plurality of image forming sections.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including a plurality of image forming units including a plurality of image forming sections and an intermediate transfer body to which a toner image formed on the plurality of image forming sections is primarily transferred, and a processor, in which the processor is configured to, in a case where a printing instruction is received in a state in which an image forming section having a combination of identical colors is set for each of the plurality of image forming units, execute the printing instruction by using an image forming unit that is in a state in which image formation is able to be executed among the plurality of image forming units.

BRIEF DESCRIPTION OF THE DRAWINGS

Exemplary embodiment(s) of the present invention will be described in detail based on the following figures, wherein.

DETAILED DESCRIPTION

An image forming apparatus according to an exemplary embodiment of the present invention will be described with reference to the drawings. First, an overall configuration and a hardware configuration of an image forming apparatus 10 will be described with reference to FIGS. 1 and 2.

Figure 1:
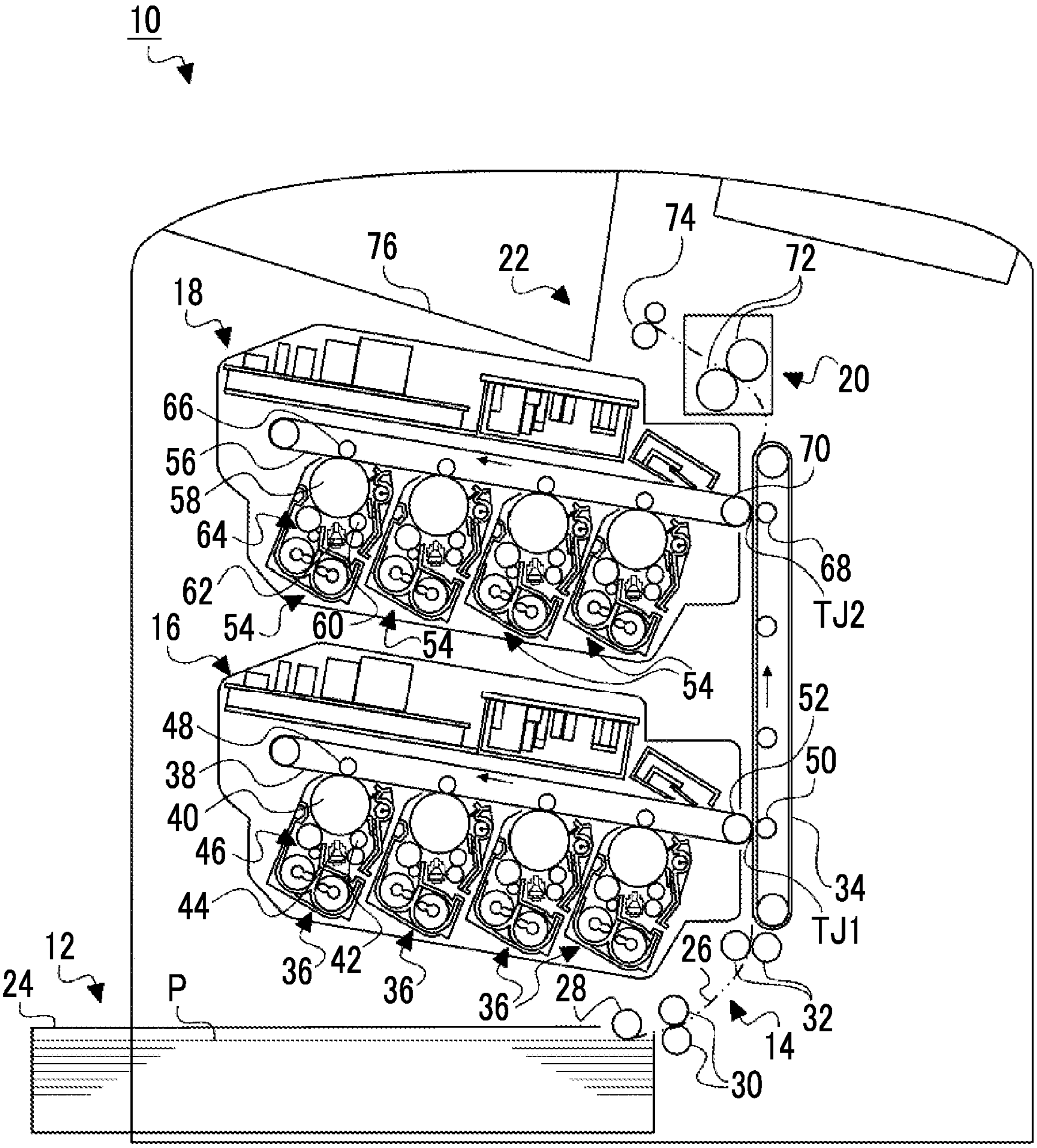
FIG. 1 is a diagram showing an overall configuration of an image forming apparatus according to an exemplary embodiment.

As shown in FIG. 1, the image forming apparatus 10 includes a paper feeding device 12, a transport device 14, a first image forming unit 16, a second image forming unit 18, a fixing device 20, and a discharge device 22.

The paper feeding device 12 includes an accommodation section 24 in which recording paper P as an example of a recording medium is accommodated, and a transmission roll 28 transmitting the recording paper P accommodated in the accommodation section 24 to be transported along a transport path 26.

The transport device 14 includes a transport roll 30, a resist roll pair 32, and a transport belt 34 in this order from the upstream side in the transport direction.

The first image forming unit 16 includes four image forming sections 36 and an endless first intermediate transfer belt 38 as an example of an intermediate transfer body. A toner image formed by the four image forming sections 36 is transferred to the first intermediate transfer belt 38, and the first intermediate transfer belt 38 is rotatably attached counterclockwise with a front view of FIG. 2. Each of the image forming sections 36 includes a photoconductor 40, a charging member 42 that charges a surface of the photoconductor 40, an exposure device 44 that irradiates the charged photoconductor 40 with exposure light, and a developing device 46 that develops an electrostatic latent image formed due to the irradiation with the exposure light to be visualized as a toner image. The toner image is an image using toner as an example of a coloring material such as a developer.

A primary transfer roll 48 is disposed at a position facing each photoconductor 40 with the first intermediate transfer belt 38 interposed therebetween, and primarily transfers a toner image formed by each developing device 46 of the image forming section 36 onto the first intermediate transfer belt 38.

A secondary transfer roll 50 is disposed in a location where the first intermediate transfer belt 38 and the transport belt 34 are close to each other to sandwich the first intermediate transfer belt 38 and the transport belt 34 between the secondary transfer roll 50 and a backup roll 52. The secondary transfer roll 50 transfers the toner image formed on the first intermediate transfer belt 38 onto the recording paper P transported between the first intermediate transfer belt 38 and the transport belt 34 at a secondary transfer position TJ1 on the upstream side.

Similar to the first image forming unit 16, the second image forming unit 18 includes four image forming sections 54 and an endless second intermediate transfer belt 56. The second intermediate transfer belt 56 is rotatably attached such that a toner image formed by the four image forming sections 54 is transferred thereto. Each of the image forming sections 54 includes a photoconductor 58, a charging member 60 that charges a surface of the photoconductor 58, an exposure device 62 that irradiates the charged photoconductor 58 with exposure light, and a developing device 64 that develops an electrostatic latent image formed due to irradiation with the exposure light to be visualized as a toner image.

The primary transfer roll 66 is disposed at a position facing each photoconductor 58 with the second intermediate transfer belt 56 interposed therebetween, and the toner image formed by the image forming section 54 is transferred onto the second intermediate transfer belt 56.

A secondary transfer roll 68 is disposed in a location where the second intermediate transfer belt 56 and the transport belt 34 are close to each other to sandwich the second intermediate transfer belt 56 and the transport belt 34 between the secondary transfer roll 68 and a backup roll 70. The secondary transfer roll 68 transfers the toner image formed on the second intermediate transfer belt 56 onto the recording paper P that is transported between the second intermediate transfer belt 56 and the transport belt 34 at a secondary transfer position TJ2 on the downstream side.

The fixing device 20 has a fixing roll pair 72, and heats and presses the toner image transferred to the recording paper P to be fixed.

The discharge device 22 has a discharge roll 74 and a discharge tray 76, and the discharge roll 74 discharges the recording paper P output from the fixing device 20 to the discharge tray 76.

The first image forming unit 16 and the second image forming unit 18 are disposed to be arranged in the vertical direction. In the present exemplary embodiment, the second image forming unit 18 is disposed above the first image forming unit 16. From another point of view, the second image forming unit 18 is disposed on the downstream side in the transport direction of the first image forming unit 16.

The image forming apparatus 10 of the present exemplary embodiment is a so-called single-pass system, and printing is performed by passing the recording paper P in front of each of the first image forming unit 16 and the second image forming unit 18 only once.

Figure 2:
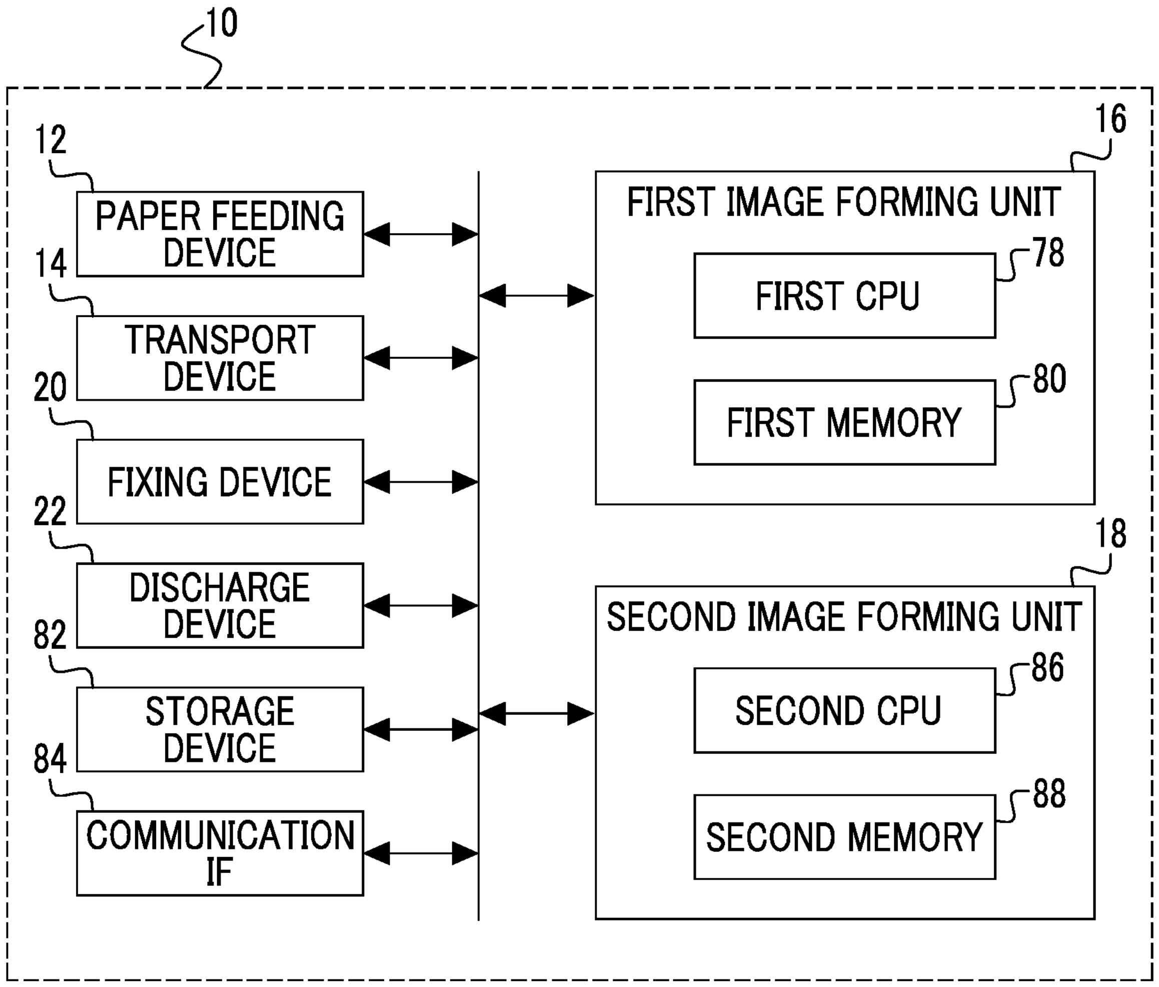
FIG. 2 is a block diagram showing an example of a hardware configuration of the image forming apparatus of the exemplary embodiment.

The first image forming unit 16 includes a control board (not shown), and a first CPU 78 and a first memory 80 are disposed on the control board as shown in FIG. 2.

The first CPU 78 is a control microprocessor, and controls an operation of each of the first image forming unit 16, the paper feeding device 12, the transport device 14, the fixing device 20, and the discharge device 22 on the basis of a control program stored in a storage device 82 that will be described later. The first memory 80 temporarily stores print data received via a communication interface 84 that will be described later.

Similarly, the second image forming unit 18 includes a control board (not shown), and a second CPU 86 and a second memory 88 are disposed on the control board.

The second CPU 86 is a control microprocessor, and controls an operation of each part the second image forming unit 18 on the basis of a control program stored in a storage device 82 that will be described later. The second memory 88 temporarily stores print data received from the first image forming unit 16.

The image forming apparatus 10 further includes the storage device 82 and the communication interface 84. The storage device 82 is configured by a hard disk drive (abbreviated to an HDD) or a solid state drive (abbreviated to an SSD), and stores a control program for controlling an operation of each part of the image forming apparatus 10. The communication interface 84 receives print data from a computer directly connected by wire or wirelessly or connected via a network, or transmits and receives information required for printing.

Figure 3:
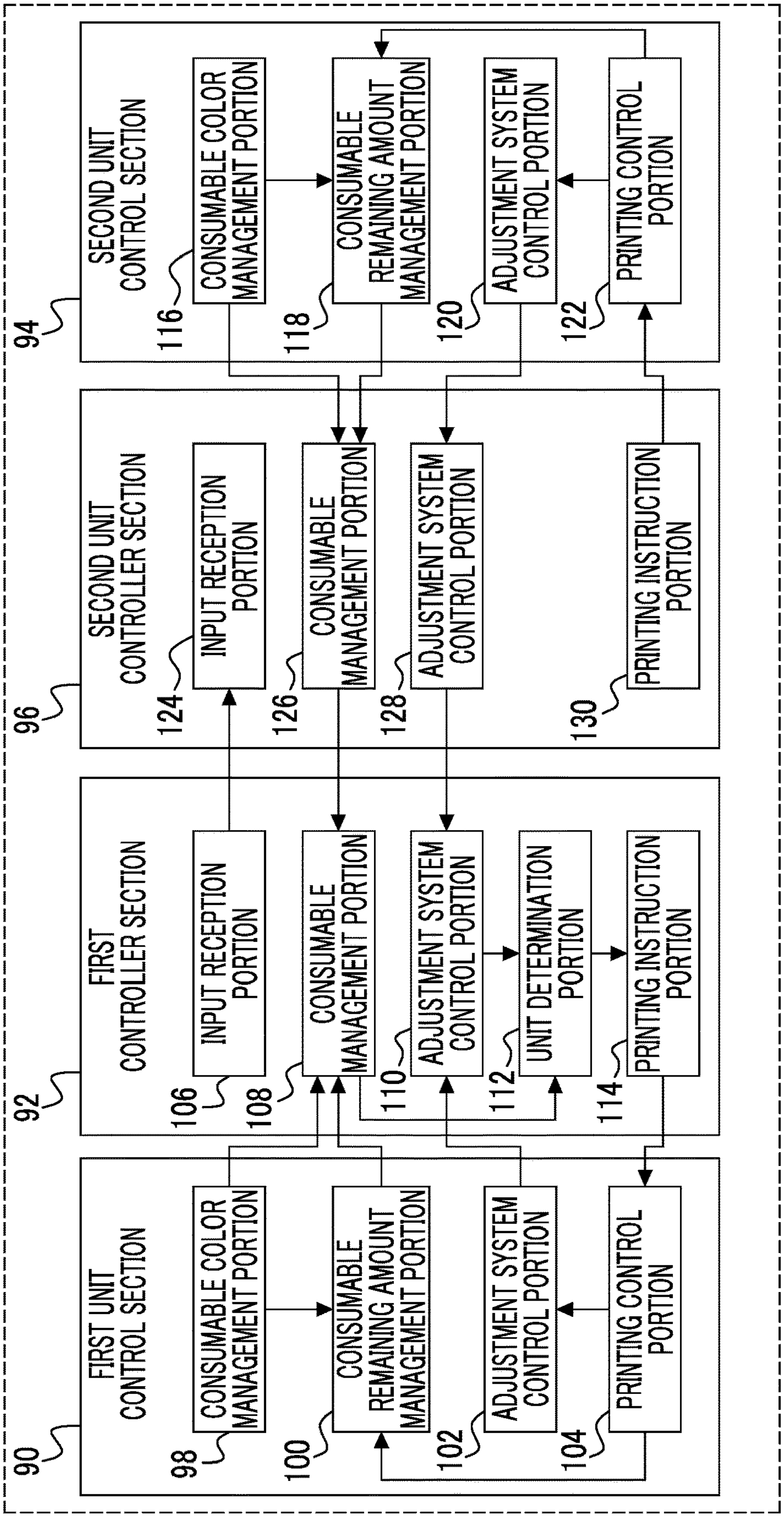
FIG. 3 is a block diagram showing a functional configuration of the image forming apparatus of the exemplary embodiment.

Next, a functional configuration of the image forming apparatus 10 of the present exemplary embodiment will be described with reference to FIG. 3. The image forming apparatus 10 executes the control program stored in the storage device 82 in the first CPU 78 and the second CPU 86. Consequently, the first CPU 78 and the second CPU 86 function as a first unit control section 90 and a first controller section 92 for the first image forming unit 16, and a second unit control section 94 and a second controller section 96 for the second image forming unit 18. The first unit control section 90 functions not only as a control section for controlling the first image forming unit 16 but also as a control section for controlling an operation of each part of the paper feeding device 12, the transport device 14, the fixing device 20, and the discharge device 22.

The first unit control section 90 includes a consumable color management portion 98, a consumable remaining amount management portion 100, an adjustment system control portion 102, and a printing control portion 104.

The consumable color management portion 98 of the first unit control section 90 manages information regarding colors of consumables such as colored particles such as toner used in the four image forming sections 36 of the first image forming unit 16. For example, information indicating that colors of the toner used in the four image forming sections 36 of the first image forming unit 16 are four colors such as cyan (C), magenta (M), yellow (Y), and black (K) is stored. A color of the toner may be four colors such as white, gold, silver, and clear, or a combination of other colors. The consumable color management portion 98 notifies a consumable management portion 108 of the first controller section 92, which will be described later, of information regarding a color of a toner container attached to the first image forming unit 16.

The consumable remaining amount management portion 100 detects information regarding a remaining amount of a consumable used in the first image forming unit 16, or calculates the information from information regarding printing performed so far, and stores the information. The consumable remaining amount management portion 100 notifies the consumable management portion 108 of the first controller section 92, which will be described later, of the remaining amount information of the toner in the toner container attached to the first image forming unit 16.

The adjustment system control portion 102 adjusts the first image forming unit 16. For example, control of replenishment of toner to the developing device 46, calibration, and cleaning of the photoconductor 40 is performed. The adjustment system control portion 102 notifies the adjustment system management portion 110 of the first controller section 92, which will be described later, of information regarding whether or not the first image forming unit 16 is being adjusted, or information indicating that the adjustment has been completed.

The printing control portion 104 controls operations of the photoconductor 40, the charging member 42, the exposure device 44, the developing device 46, and the first intermediate transfer belt 38 of the first image forming unit 16, and performs image formation using the first image forming unit 16. In at least either a case where image formation by the own unit is performed or a case where image formation is performed by the second image forming unit 18, the printing control portion 104 also controls an operation of each part of the paper feeding device 12, the transport device 14, the fixing device 20, and the discharge device 22.

The first controller section 92 includes an input reception portion 106, a consumable management portion 108, an adjustment system management portion 110, a unit determination portion 112, and a printing instruction portion 114.

The input reception portion 106 of the first controller section 92 receives a printing instruction transmitted from application software of a computer connected via the communication interface 84, and temporarily stores the printing instruction in the first memory 80. The printing instruction is a print command consisting of one or a plurality of pieces of print data and a series of processing commands, and the print data includes at least one of text data or image data. Upon receiving the printing instruction, the input reception portion 106 transmits the printing instruction to an input reception portion 124 of the second controller section 96, which will be described later. The input reception portion 106 converts the printing instruction stored in the first memory 80 into printable image data such as a raster image on the basis of print data and processing commands included in the printing instruction, and stores the image data in the first memory 80.

The consumable management portion 108 acquires and stores the information regarding the color of the toner of the first image forming unit 16 reported from the consumable color management portion 98 of the first image forming unit 16. The information regarding the color of the toner of the second image forming unit 18 reported from the consumable management portion 108 of the second image forming unit 18, which will be described later, is acquired and stored. Therefore, the consumable management portion 108 stores a color combination that can be printed by the image forming apparatus 10. The consumable management portion 108 acquires and stores the remaining amount of the toner of the first image forming unit 16 reported from the consumable remaining amount management portion 100 of the first image forming unit 16. The remaining amount of the toner of the second image forming unit 18 reported from the consumable management portion 108 of the second image forming unit 18, which will be described later, is acquired and stored.

The adjustment system management portion 110 acquires adjustment information of the first image forming unit 16 and the current situation, which are reported from the adjustment system control portion 102 of the first unit control section 90. The adjustment system management portion 110 determines whether the first image forming unit 16 is in a state in which image formation can be executed or a state in which image formation cannot be executed, and stores the information. The adjustment system management portion 110 acquires and stores information regarding whether the second image forming unit 18 reported from the adjustment system management portion 128 of the second controller section 96, which will be described later, in a state in which image formation can be executed or is in a state in which image formation cannot be executed.

The unit determination portion 112 determines which of the first image forming unit 16 and the second image forming unit 18 is used to execute a printing instruction. Specifically, the unit determination portion 112 performs the determination on the basis of the information regarding the color and the remaining amount of the toner stored in the consumable management portion 108, and the information regarding whether or not the first image forming unit 16 and the second image forming unit 18 are in a state in which image formation can be executed, stored in the adjustment system management portion 110.

The printing instruction portion 114 transmits an instruction for performing image formation in the image forming unit determined by the unit determination portion 112.

Specifically, in a case where the unit determination portion 112 determines that image formation is performed by using the first image forming unit 16, the printing instruction portion 114 transmits the raster image stored in the memory 80 to the printing control portion 104 of the first unit control section 90, and thus gives an instruction for image formation. On the other hand, in a case where the unit determination portion 112 determines that the image formation is performed by using the second image forming unit 18, the printing instruction portion 114 notifies the second controller section 96 of an instruction for image formation in the second image forming unit 18.

Similar to the first unit control section 90, the second unit control section 94 includes a consumable color management portion 116, a consumable remaining amount management portion 118, an adjustment system control portion 120, and a printing control portion 122.

The consumable color management portion 116 of the second unit control section 94 manages information regarding a color of toner used in the second image forming unit 18. For example, information indicating that colors of the toner used in the first image forming unit 16 are four colors such as cyan (C), magenta (M), yellow (Y), and black (K) is stored. A color of the toner may be four colors such as white, gold, silver, and clear, or a combination of other colors. The consumable color management portion 116 notifies the consumable management portion 126 of the second controller section 96, which will be described later, of information regarding a color of a toner container attached to the second image forming unit 18.

The consumable remaining amount management portion 118 detects information regarding a remaining amount of a consumable which are colored particles such as toner used in the second image forming unit 18, or calculates the information from information regarding printing performed so far, and stores the information. The consumable remaining amount management portion 118 notifies the consumable management portion 126 of the second controller section 96, which will be described later, of the remaining amount information of the toner stored by the consumable remaining amount management portion 118.

The adjustment system control portion 120 adjusts the second image forming unit 18. For example, control of replenishment of toner to the developing device 64, calibration, and cleaning of the photoconductor 58 is performed. The adjustment system control portion 120 notifies the adjustment system management portion 128 of the second controller section 96, which will be described later, of information regarding whether or not the second image forming unit 18 is being adjusted, or information indicating that the adjustment has been completed.

The printing control portion 122 controls operations of the photoconductor 58, the charging member 60, the exposure device 62, the developing device 64, and the second intermediate transfer belt 56 of the second image forming unit 18, and performs image formation using the second image forming unit 18.

The second controller section 96 includes an input reception portion 124, a consumable management portion 126, an adjustment system management portion 128, and a printing instruction portion 130.

The input reception portion 124 of the second controller section 96 receives a printing instruction transmitted from the input reception portion 106 of the first controller section 92 and temporarily stores the printing instruction in the second memory 88. The input reception portion 124 converts the printing instruction stored in the second memory 88 into printable image data such as a raster image on the basis of the image data and the processing commands included in the printing instruction, and stores the image data in the second memory 88.

The consumable management portion 126 acquires and stores the information regarding the color of the toner of the second image forming unit 18 reported from the consumable color management portion 116 of the second image forming unit 18, and the information regarding the remaining amount information of the toner reported from the consumable remaining amount management portion 118. The consumable management portion 126 notifies the consumable management portion 108 of the first controller section 92 of information regarding the color and the remaining amount of the toner mounted in the second image forming unit 18.

The adjustment system management portion 128 acquires the adjustment information of the second image forming unit 18 reported from the adjustment system control portion 120 of the second unit control section 94 and the current situation. The adjustment system management portion 128 determines whether the second image forming unit 18 is in a state in which image formation can be executed or a state in which image formation cannot be executed, and stores the information. The adjustment system management portion 128 notifies the adjustment system management portion 110 of the first controller section 92 of information regarding whether the second image forming unit 18 is in a state in which image formation can be executed or a state in which image formation cannot be executed.

The printing instruction portion 130 transmits the raster image stored in the second memory 88 to the printing control portion 122 of the second unit control section 94 on the basis of an instruction from the printing instruction portion 114 of the first controller section 92, and thus performs image formation.

Figure 4:
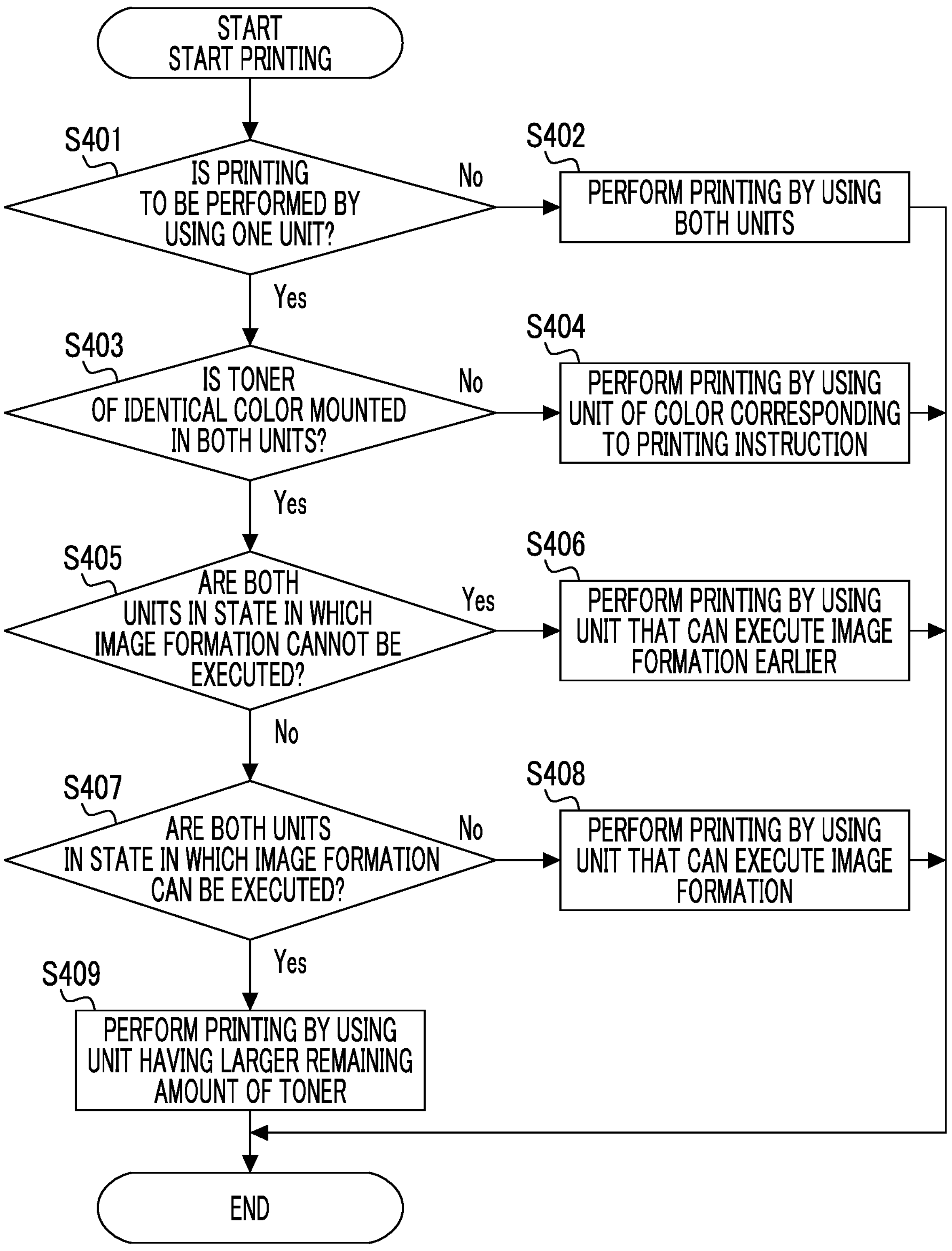
FIG. 4 is a flowchart showing a general flow of a printing process of the image forming apparatus of the exemplary embodiment.

Next, image formation by the image forming apparatus 10 of the present exemplary embodiment will be described with reference to FIG. 4. FIG. 4 is a flowchart showing a general flow of a printing process of the image forming apparatus of the exemplary embodiment. In step S401 in FIG. 4, in a case where the first controller section 92 receives a printing instruction, the first controller section 92 determines whether or not the printing instruction is an instruction for performing printing by using one of the image forming units. In a case where it is determined that the printing instruction is not an instruction for performing printing by using only one image forming unit, in step S402, printing using a total of eight colors is performed by using both the first image forming unit 16 and the second image forming unit 18. In this case, the first controller section 92 checks whether a toner container of a designated color is attached to the first image forming unit 16 and the second image forming unit 18. In a case where the toner container of the designated color is attached, image formation is performed by using both the first image forming unit 16 and the second image forming unit 18. On the other hand, in a case where the toner container of the designated color is not attached, error information indicating that printing cannot be executed is transmitted to the computer that has transmitted the printing instruction.

In step S401, in a case where it is determined in step S401 that the received printing instruction is an instruction for image formation using one image forming unit, the process proceeds to step S403. In step S403, the first controller section 92 determines whether or not toner containers having a combination of identical colors are attached to the first image forming unit 16 and the second image forming unit

18. This is determined by the consumable management portion 108 on the basis of toner color information received from the consumable color management portion 98 and the consumable management portion 126 of the second controller section 96.

In a case where it is determined that the toner containers having a combination of identical colors are not attached to both the first image forming unit 16 and the second image forming unit 18, the process proceeds to step S404. For example, this is a case where the first image forming unit 16 is equipped with toner containers of four colors of CMYK, whereas the second image forming unit 18 is equipped with toner containers of four colors of white, gold, silver, and clear.

In step S404, the image forming apparatus 10 selects an image forming unit having a color combination corresponding to the printing instruction from the two image forming units, and uses the selected image forming unit to form a printed matter of four colors of CMYK or white, gold, silver, and clear.

In step S403, in a case where it is determined that both the first image forming unit 16 and the second image forming unit 18 are equipped with the toner containers having a combination of identical colors, the process proceeds to step S405. This is a case where, for example, both image forming units are respectively equipped with toner having CMYK. In step S405, the first controller section 92 determines whether or not both the first image forming unit 16 and the second image forming unit 18 are in a state in which image formation cannot be executed. In a case where it is determined that both the first image forming unit 16 and the second image forming unit 18 are in a state in which image formation cannot be executed, the process proceeds to step S406. The state in which the image formation cannot be executed is a state in which each image forming unit operates for a reason other than the image formation, for example, during replenishment of toner to the developing devices 46 and 64, calibration, and cleaning of the photoconductors 40 and 58. In step S406, image formation is performed by using the image forming unit that enables earlier image formation out of the first image forming unit 16 and the second image forming unit 18.

In step S405, in a case where it is determined that both the first image forming unit 16 and the second image forming unit 18 are not in a state in which image formation cannot be executed, the process proceeds to step S407. In step S407, it is determined whether or not both the first image forming unit 16 and the second image forming unit 18 are in a state in which image formation can be executed. In a case where it is determined that not both are able to form an image and one is unable to form an image, the process proceeds to step S408, and printing instruction is executed by using the image forming unit that is able to form an image out of the first image forming unit 16 and the second image forming unit 18. On the other hand, in a case where it is determined that both the first image forming unit 16 and the second image forming unit 18 can form an image, the process proceeds to step S409, an image forming unit having a larger remaining amount of toner is selected, and a printing instruction is executed.

In the present exemplary embodiment, the processes in and after step S405 in FIG. 4 will be described in detail with reference to FIG. 5 to FIG. 10. The following processes describe the following six patterns.

[Pattern 1] A case where both image forming units are in a state in which image formation cannot be executed and the second image forming unit 18 can form an image first

[Pattern 2] A case where both image forming units are in a state in which image formation cannot be executed and the first image forming unit 16 can form an image first

[Pattern 3] A case where only the first image forming unit 16 is in a state in which image formation cannot be executed

[Pattern 4] A case where only the first image forming unit 16 is unable to form an image, and the second image forming unit 18 is also unable to form an image after receiving a printing instruction

[Pattern 5] A case where only the second image forming unit 18 is in a state in which image formation cannot be executed

[Pattern 6] A case where both image forming units are in a state in which image formation can be executed The following process is a process it is determined that in a case where, through the processes in step S401 and step S403 in FIG. 4, the printing instruction is an instruction for image formation using one image forming unit, and toner containers having a combination of identical colors are attached to both image forming units.

Pattern 1

Figure 5:
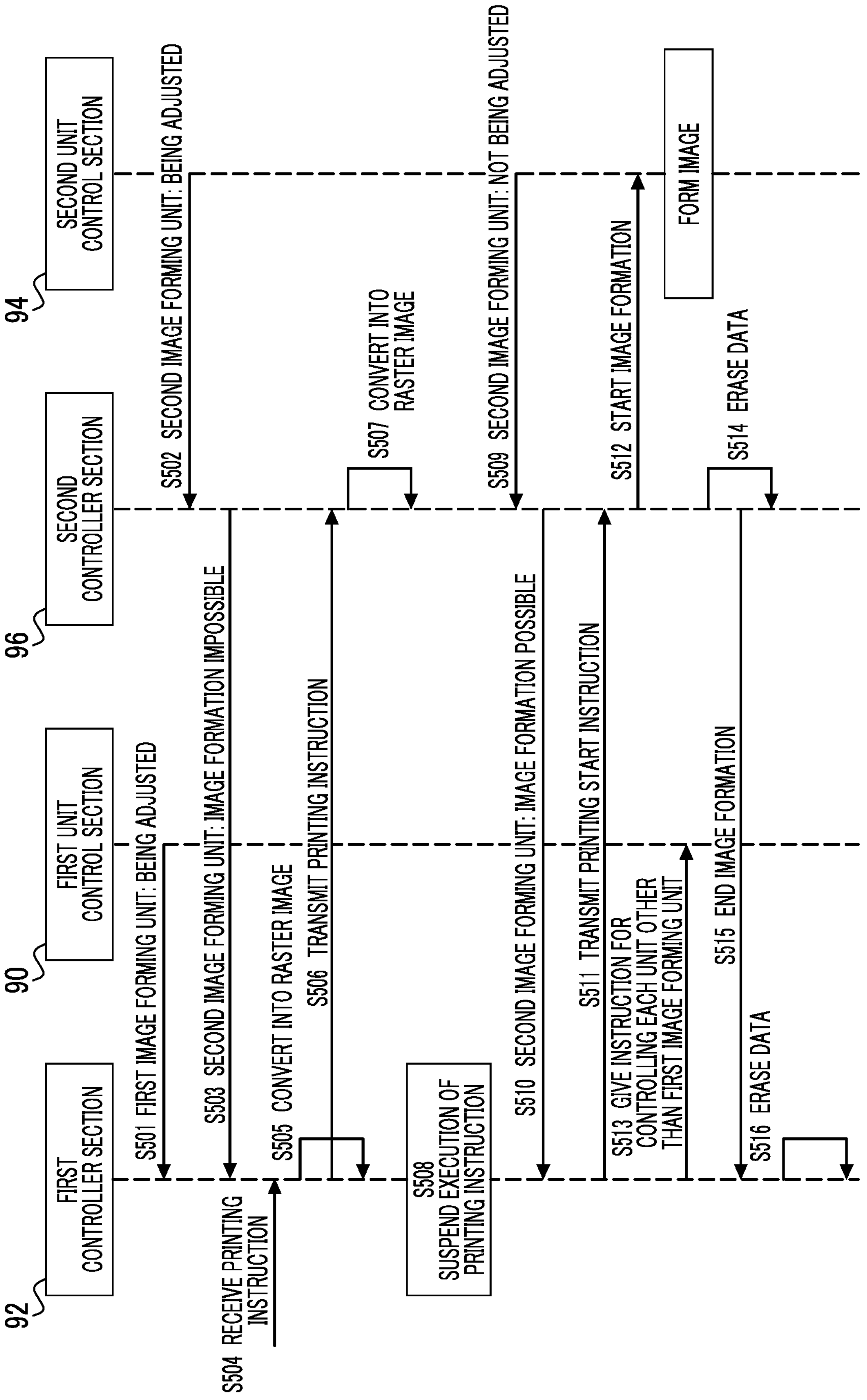
FIG. 5 is a sequence diagram showing a process in a case where both of two image forming units cannot execute image formation, and in a case where a second image forming unit 18 can form an image first.

FIG. 5 is a sequence diagram showing a process in a case where both the first image forming unit 16 and the second image forming unit 18 cannot execute image formation in step S405 in FIG. 4, and the second image forming unit 18 can form an image first.

In step S501 in FIG. 5, the adjustment system control portion 102 of the first unit control section 90 notifies the adjustment system management portion 110 of the controller section 92 that the first image forming unit 16 is being adjusted when the first image forming unit 16 starts the adjustment. In step S502, the adjustment system control portion 120 of the second unit control section 94 notifies the adjustment system management portion 128 of the second controller section 96 that the second image forming unit 18 is being adjusted when the second image forming unit 18 starts the adjustment. In step S503, the adjustment system management portion 128 determines that the second image forming unit 18 is in a state in which image formation cannot be executed, and notifies the adjustment system management portion 110 of the first controller section 92 of the fact. The adjustment system management portion 110 ascertains that both the first image forming unit 16 and the second image forming unit 18 are in a state in which image formation cannot be executed.

In step S504, the input reception portion 106 of the first controller section 92 receives a printing instruction transmitted from the application software of the computer connected via the communication interface 84. In step S505, the input reception portion 106 converts the printing instruction into printable image data such as a raster image on the basis of print data and processing commands included in the printing instruction, and stores the image data in the first memory 80. In step S506, the input reception portion 106 transmits the received printing instruction to the input reception portion 124 of the second controller section 96, which will be described later.

In step S507, the input reception portion 124 of the second controller section 96 converts the printing instruction received from the first controller section 92 into printable image data such as a raster image on the basis of print data and processing commands included in the printing instruction, and stores the image data in the second memory 88.

In step S508, the printing instruction portion 114 of the first controller section 92 does not transmit an instruction for starting image formation until either the first image forming unit 16 or the second image forming unit 18 is in a state in which image formation can be executed. Consequently, the process waits for a state in which image formation can be performed, and execution of the printing instruction is suspended. Alternatively, an instruction for suspending execution of the printing instruction may be transmitted to the printing control portion 104 and the second controller section 96 by waiting for the image formation.

In step S509, the adjustment system control portion 120 of the second unit control section 94 notifies the adjustment system management portion 128 of the second controller section 96 that the second image forming unit 18 is not being adjusted in a case where the adjustment of the second image forming unit 18 has been completed.

In step S510, the adjustment system management portion 128 notifies the adjustment system management portion 110 of the first controller section 92 that the second image forming unit 18 is in a state in which image formation can be executed.

In a case where the adjustment system management portion 110 receives the notification that the second image forming unit 18 is in a state in which image formation can be executed, in step S511, the unit determination portion 112 of the first controller section 92 determines that the second image forming unit 18 will perform image formation. The printing instruction portion 114 notifies the second controller section 96 of an instruction for starting printing.

Upon receiving the notification of the start of image formation, in step S512, the printing instruction portion 130 of the second controller section 96 instructs the printing control portion 122 of the second unit control section 94 to start printing, and forms an image on the recording paper P according to the image data stored in the second memory 88. At the time of image formation in the second image forming unit 18, in step S513, the printing instruction portion 114 of the first controller section 92 instructs the printing control portion 104 to control operations of the paper feeding device 12, the transport device 14, the fixing device 20, and the discharge device 22 and to perform a printing process.

In a case where image formation has been ended, in step S514, the printing instruction portion 130 of the second controller section 96 erases the printing instruction and the image data stored in the second memory 88. In step S515, the printing instruction portion 130 of the second controller section 96 transmits information indicating that the image formation has been ended to the first controller section 92.

In step S516, the printing instruction portion 130 of the first controller section 92 erases the printing instruction and the image data stored in the own first memory 80, and ends the process.

Pattern 2

Figure 6:
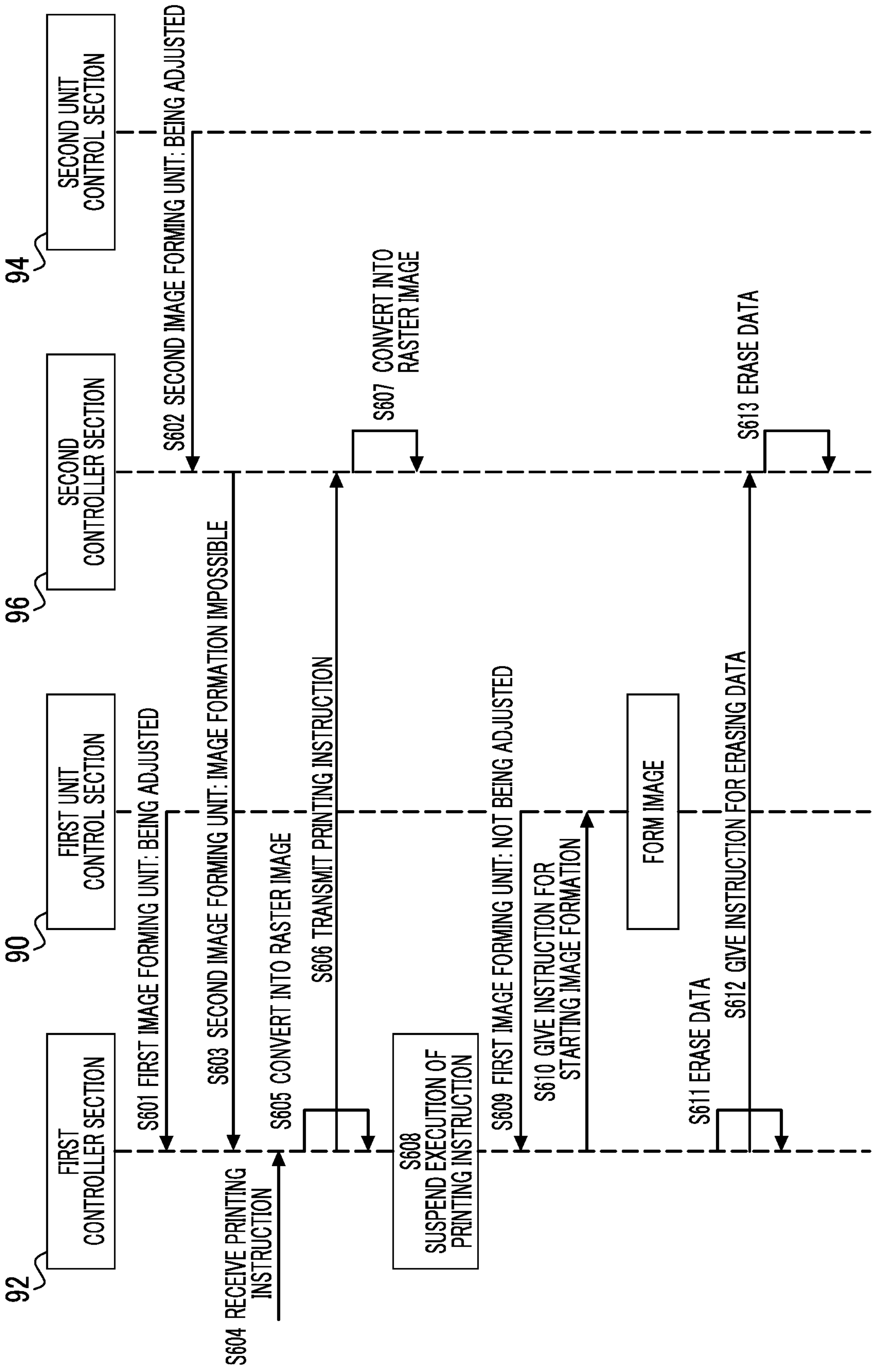
FIG. 6 is a sequence diagram showing a process in a case where both of the two image forming units cannot execute image formation, and in a case where a first image forming unit 16 can form an image first.

Next, with reference to FIG. 6, a case where neither the first image forming unit 16 nor the second image forming unit 18 can execute image formation and the first image forming unit 16 can form an image first will be described. Since the processes in step S601 to step S608 in FIG. 6 are identical to the processes in step S501 to step S508 in FIG. 5, detailed description thereof will be omitted.

In step S609, the adjustment system control portion 102 of the first unit control section 90 notifies the adjustment system management portion 110 of the first controller section 92 that the first image forming unit 16 is not being adjusted in a case where the adjustment of the first image forming unit 16 has been completed. The adjustment system management portion 110 determines that the first image forming unit 16 is in a state in which image formation can be executed.

In step S610, the unit determination portion 112 of the first controller section 92 determines that image formation will be performed in the first image forming unit 16, and the printing instruction portion 114 notifies the printing control portion 104 of the first unit control section 90 of an instruction for starting printing. The printing control portion 104 uses the first image forming unit 16 to form an image on the recording paper P according to the image data stored in the first memory 80. In this case, the printing control portion 104 controls an operation of each part of the paper feeding device 12, the transport device 14, the fixing device 20, and the discharge device 22, and performs a printing process.

In a case where printing has been completed, in step S611, the printing instruction portion 130 of the first controller section 92 erases the printing instruction and the image data stored in the own first memory 80. In step S612, an instruction for erasing the printing instruction is transmitted to the second controller section 96. In step S613, the printing instruction portion 130 of the second controller section 96 erases the printing instruction and the image data stored in the second memory 88, and ends the process.

Pattern 3

Figure 7:
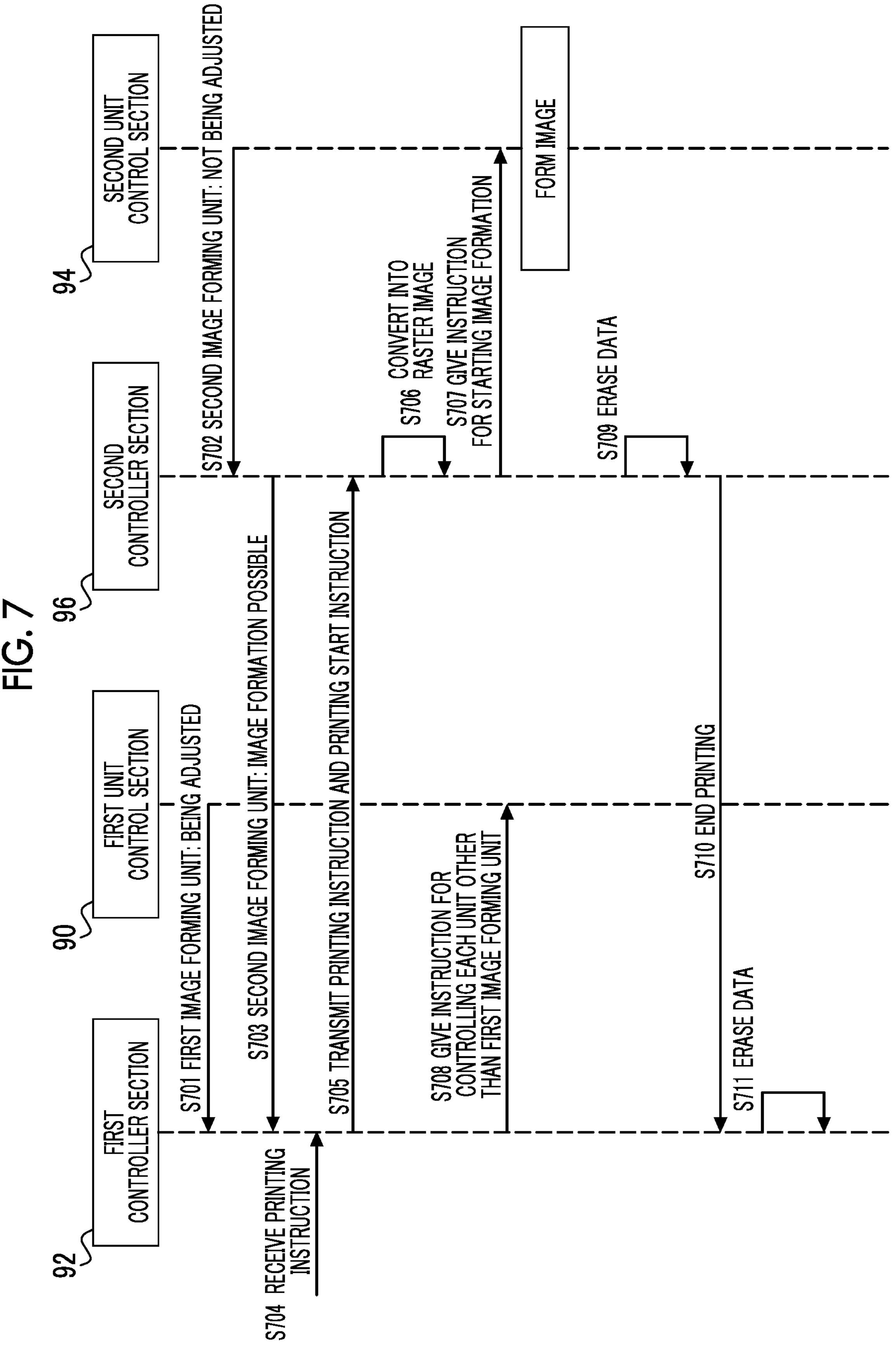
FIG. 7 is a sequence diagram showing a process in a case where only the first image forming unit out of the two image forming units cannot form an image.

FIG. 7 is a sequence diagram showing a process in a case where only the first image forming unit 16 out of the two image forming units cannot form an image in step S407 in FIG. 4. In step S701 in FIG. 7, the adjustment system control portion 102 of the first unit control section 90 notifies the adjustment system management portion 110 of the first controller section 92 that the first image forming unit 16 is being adjusted in a case where the first image forming unit 16 starts adjustment. In step S702, the adjustment system control portion 120 of the second unit control section 94 notifies the adjustment system management portion 128 of the second controller section 96 that the second image forming unit 18 is not being adjusted. This notification may be a notification that adjustment has been ended in a case where the adjustment of the second image forming unit 18 has been ended. In step S703, the adjustment system management portion 128 notifies the adjustment system management portion 110 of the first controller section 92 that the second image forming unit 18 is in a state in which image formation can be executed. The adjustment system management portion 110 stores information indicating that the first image forming unit 16 is in a state in which image formation cannot be executed, whereas the second image forming unit 18 is in a state in which image formation can be executed.

In step S704, the input reception portion 106 of the first controller section 92 receives a printing instruction transmitted from the application software of the computer connected via the communication interface 84.

In step S705, the unit determination portion 112 of the first controller section 92 determines that the second image forming unit 18 that is not being adjusted is in a state in which image formation can be executed, and determines that image formation will be performed by using the second image forming unit 18. The input reception portion 106 of the first controller section 92 transmits a printing instruction to the input reception portion 124 of the second controller section 96. The printing instruction portion 114 of the first controller section 92 instructs the printing control portion 104 of the second unit control section 94 to start printing.

In step S706, the input reception portion 124 of the second controller section 96 converts the printing instruction received from the first controller section 92 into printable image data such as a raster image on the basis of print data and processing commands included in the printing instruction and stores the image data in the second memory 88.

In step S707, the printing instruction portion 130 of the second controller section 96 instructs the printing control portion 122 of the second unit control section 94 to start image formation, and forms an image on the recording paper P according to the image data stored in the second memory 88 by using the second image forming unit 18.

At the time of image formation using the second image forming unit 18, in step S708, the printing instruction portion 114 of the first controller section 92 instructs the printing control portion 104 of the first unit control section 90 to control the paper feeding device 12, the transport device 14, the fixing device 20, and the discharge device 22.

In a case where image formation has been ended, in step S709, the printing instruction portion 130 of the second controller section 96 erases the printing instruction and the image data stored in the second memory 88. In step S710, the printing instruction portion 130 of the second controller section 96 transmits information indicating that the image formation has been completed to the first controller section 92.

In step S711, the printing instruction portion 130 of the first controller section 92 erases the printing instruction and the image data stored in the own first memory 80, and ends the process.

Pattern 4

Figure 8:
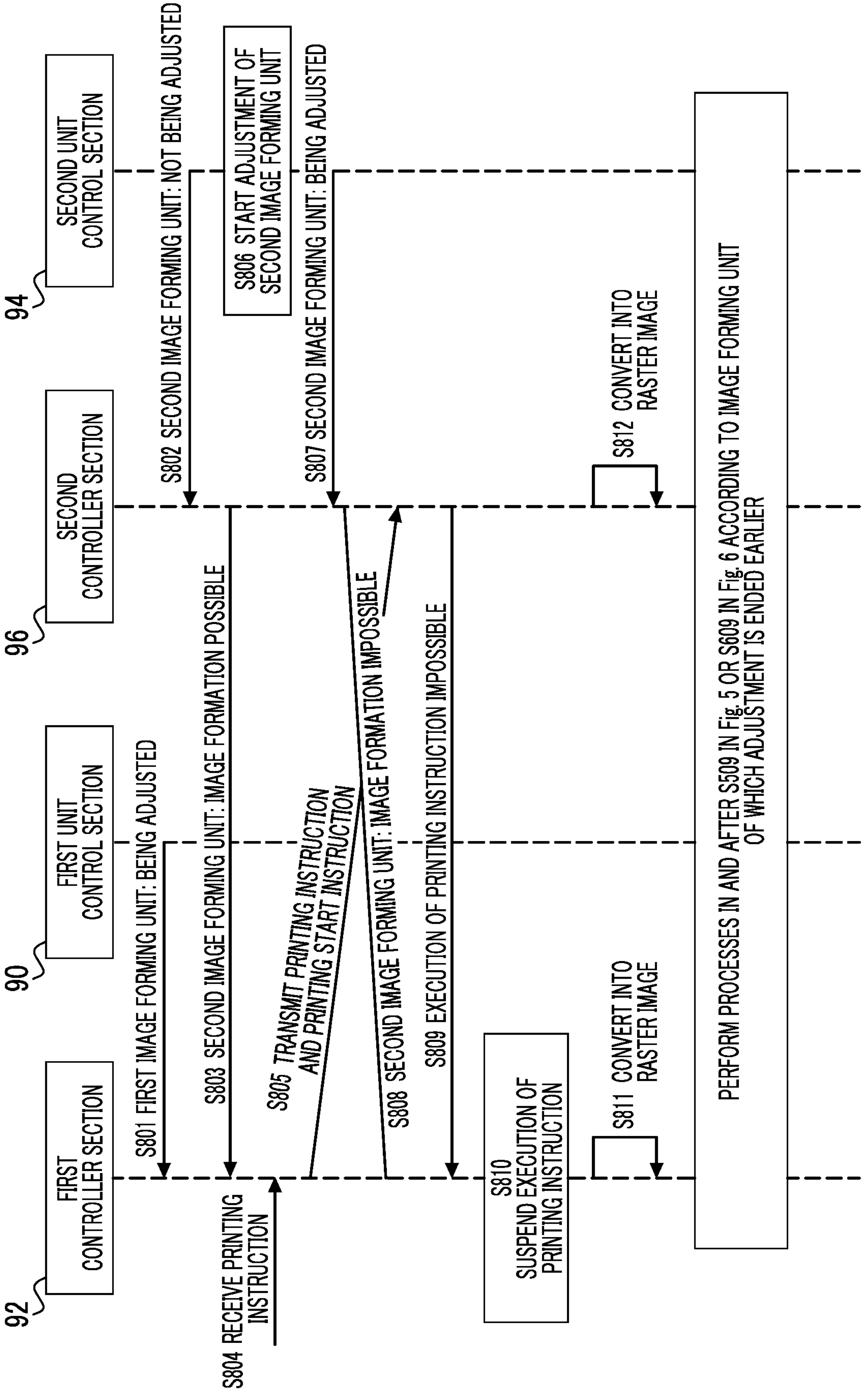
FIG. 8 is a sequence diagram showing a process in a case where the second image forming unit is also in a state in which image formation cannot be executed when the second image forming unit is to execute image formation because the first image forming unit out of the two image forming units is in a state in which image formation cannot be executed.

FIG. 8 is a sequence diagram showing a process in a case where the second image forming unit 18 is in a state in which image formation cannot be executed when the second image forming unit 18 attempts to execute the image formation because the first image forming unit 16 is in a state in which the image formation cannot be executed. Since the processes in step S801 to step S804 in FIG. 8 are identical to the processes in step S701 to step S704 in FIG. 7, description thereof will be omitted.

In step S805, the unit determination portion 112 of the first controller section 92 determines that the second image forming unit 18 that is not being adjusted is in a state in which image formation can be executed, and determines that image formation will be performed by using the second image forming unit 18. The input reception portion 106 of the first controller section 92 transmits a printing instruction to the input reception portion 124 of the second controller section 96.

In this case, it is assumed that adjustment of the second image forming unit 18 is started in step S806 before the input reception portion 124 of the second controller section 96 receives the printing instruction. Then, in step S807, the adjustment system control portion 120 of the second unit control section 94 notifies the adjustment system management portion 128 of the second controller section 96 that the second image forming unit 18 is being adjusted. In step S808, the adjustment system management portion 128 notifies the adjustment system management portion 110 of the first controller section 92 that the second image forming unit 18 is in a state in which image formation cannot be executed.

Here, the second controller section 96 receives a printing instruction and an instruction for starting printing after the adjustment system management portion 128 of the second controller section 96 transmits a notification that the second image forming unit 18 is in a state in which image formation cannot be executed to the first controller section 92. Therefore, in step S809, the adjustment system management portion 128 of the second controller section 96 notifies the first controller section 92 that the image forming unit 18 cannot perform image formation corresponding to the received printing instruction.

In step S810, the printing instruction portion 114 of the first controller section 92 does not transmit an instruction for starting image formation until either the first image forming unit 16 or the second image forming unit 18 is in a state in which image formation can be executed. Consequently, the process waits for a state in which image formation can be performed, and execution of the printing instruction is suspended. Alternatively, an instruction for suspending execution of the printing instruction may be transmitted to the printing control portion 104 and the second controller section 96 by waiting for the image formation.

While the execution of the printing instruction is suspended, in step S811, the input reception portion 106 of the first controller section 92 converts the printing instruction into printable image data such as a raster image on the basis of print data and processing commands included in the printing instruction and stores the image data in the first memory 80. In step S812, the input reception portion 124 of the second controller section 96 converts the printing instruction received from the first controller section 92 into printable image data such as a raster image on the basis of print data and processing commands included in the printing instruction and stores the image data in the second memory 88.

The subsequent processes correspond to the processes in and after step S509 in FIG. 5 or the processes in and after step S609 in FIG. 6 performed by executing the suspended printing instruction because one of the first image forming unit 16 and the second image forming unit 18 can execute image formation earlier. Therefore, detailed description thereof will be omitted.

Pattern 5

Figure 9:
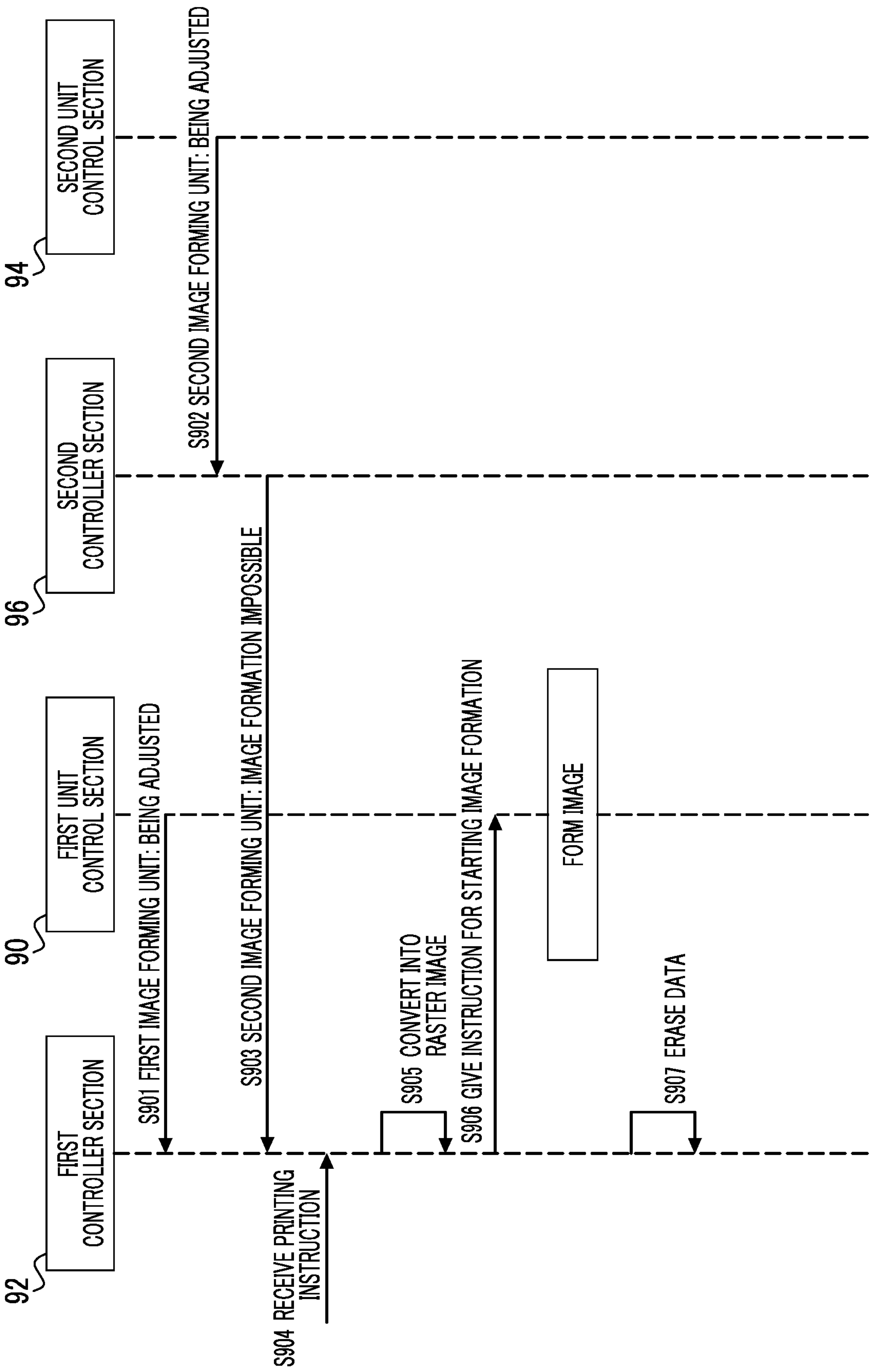
FIG. 9 is a sequence diagram showing a process in a case where only the second image forming unit out of two image forming units is being adjusted.

FIG. 9 is a sequence diagram showing a process in a case where only the second image forming unit 18 out of the two image forming units is being adjusted. In step S901 in FIG. 9, the adjustment system control portion 102 of the first unit control section 90 notifies the adjustment system management portion 110 of the first controller section 92 that the first image forming unit 16 is not being adjusted.

In step S902, in a case where the second image forming unit 18 starts adjustment, the adjustment system control portion 120 of the second unit control section 94 notifies the adjustment system management portion 128 of the second controller section 96 that the second image forming unit 18 is being adjusted. In step S903, the adjustment system management portion 128 notifies the adjustment system management portion 110 of the first controller section 92 that the second image forming unit 18 is in a state in which image formation cannot be executed. The adjustment system management portion 110 stores information indicating that the first image forming unit 16 is in a state in which image formation can be executed, whereas the second image forming unit 18 is in a state in which image formation cannot be executed.

In step S904, the input reception portion 106 of the first controller section 92 receives a printing instruction transmitted from the application software of the computer connected via the communication interface 84.

In step S905, the unit determination portion 112 of the first controller section 92 determines to execute the printing instruction in the first image forming unit 16 that is not being adjusted. The input reception portion 106 converts the received printing instruction into printable image data such as a raster image on the basis of print data and processing commands included in the printing instruction and stores the image data in the first memory 80.

In step S906, the printing instruction portion 114 of the first controller section 92 instructs the printing control portion 104 of the first unit control section 90 to start printing. The printing control portion 104 uses the first image forming unit 16 to form an image on the recording paper P according to the image data stored in the first memory 80. In this case, the printing control portion 104 controls an operation of each part of the paper feeding device 12, the transport device 14, the fixing device 20, and the discharge device 22, and performs a printing process.

In a case where printing has been completed, in step S907, the printing instruction portion 130 of the first controller section 92 erases the printing instruction and the image data stored in the own first memory 80, and ends the process.

Pattern 6

Figure 10:
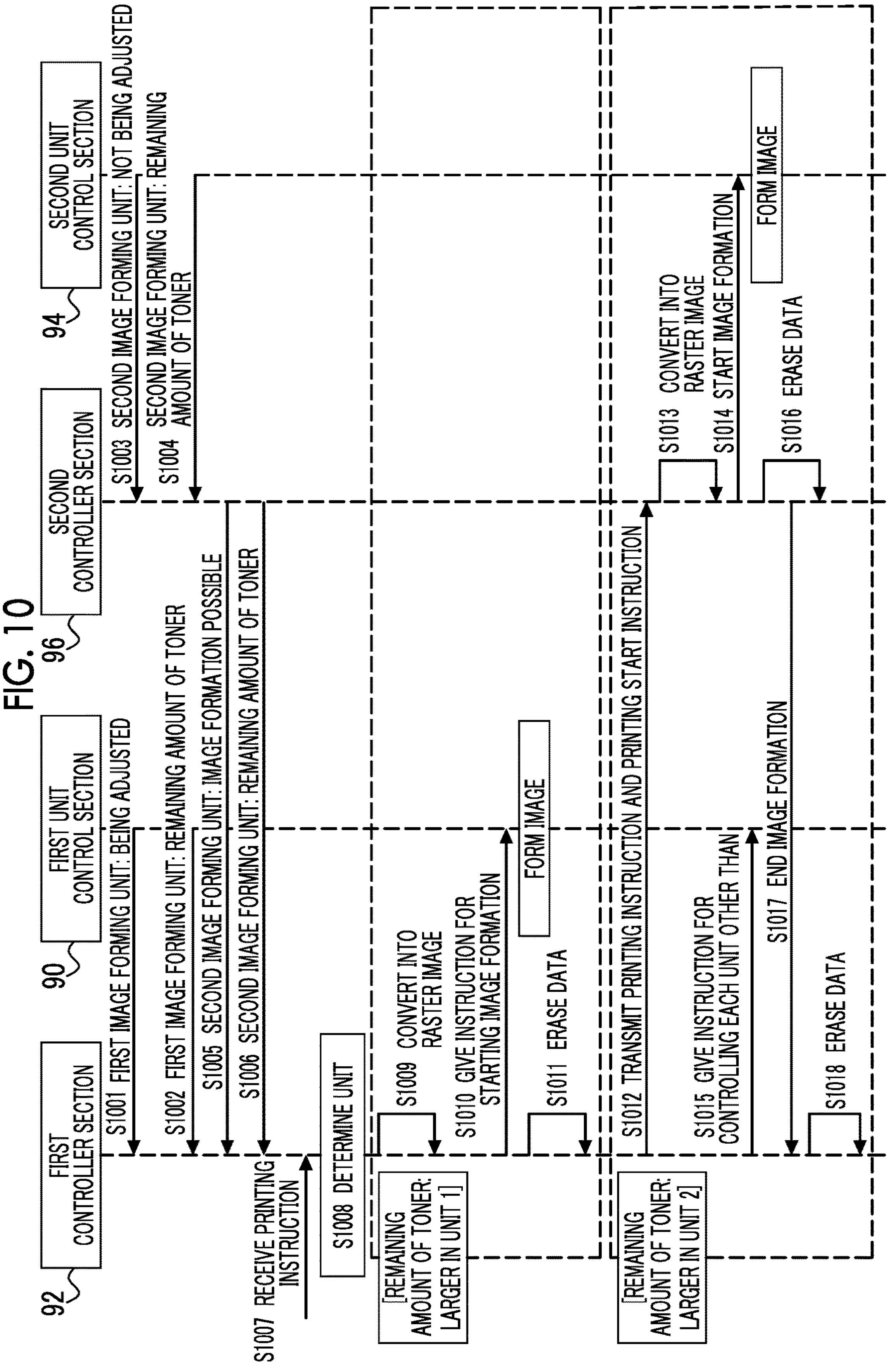
FIG. 10 is a sequence diagram showing a process in a case where it is determined that both of the two image forming units are in a state in which image formation can be executed.

FIG. 10 is a sequence diagram showing a process in a case where it is determined that both of the two image forming units are in a state in which image formation can be executed. In step S1001 in FIG. 10, the adjustment system control portion 102 of the first unit control section 90 notifies the adjustment system management portion 110 of the first controller section 92 that the first image forming unit 16 is not being adjusted. In step S1002, the consumable remaining amount management portion 100 of the first unit control section 90 detects a remaining amount of toner of each color used in the first image forming unit 16, and notifies the consumable management portion 108 of the first controller section 92 of the remaining amount.

In step S1003, the adjustment system control portion 120 of the second unit control section 94 notifies the adjustment system management portion 128 of the second controller section 96 that the second image forming unit 18 is not being adjusted. In step S1004, the consumable remaining amount management portion 118 of the second unit control section 94 detects a remaining amount of toner of each color used in the second image forming unit 18, and notifies the consumable management portion 126 of the second controller section 96 of the remaining amount.

In step S1005, the adjustment system management portion 128 of the second controller section 96 notifies the adjustment system management portion 110 of the first controller section 92 that the second image forming unit 18 is in a state in which image formation can be executed. In step S1006, the consumable management portion 126 of the second controller section 96 notifies the consumable management portion 108 of the first controller section 92 of information regarding the remaining amount of toner of each color used in the second image forming unit 18. Therefore, the adjustment system management portion 110 of the first controller section 92 stores information indicating that both the first image forming unit 16 and the second image forming unit 18 are in a state in which image formation can be executed. The consumable management portion 108 of the first controller section 92 stores information regarding the remaining amount of toner in the first image forming unit 16 and information regarding the remaining amount of toner in the second image forming unit 18.

In step S1007, the input reception portion 106 of the first controller section 92 receives a printing instruction transmitted from the application software of the computer connected via the communication interface 84.

In step S1008, the unit determination portion 112 compares the information regarding the remaining amount of toner between the first image forming unit 16 and the second image forming unit 18 stored in the consumable management portion 108, and determines which image forming unit is to be used to execute a printing instruction. For example, the unit determination portion 112 selects an image forming unit having a larger remaining amount of toner and determines to execute the printing instruction.

Specifically, for example, an average value of the remaining amount of toner in the first image forming unit 16 and an average value of the remaining amount of toner in the second image forming unit 18 are compared, and it is determined that image formation will be performed by using an image forming unit having a greater average value of the remaining amount. Alternatively, the unit determination portion 112 may compare colors having the smallest remaining amount of toner among the respective colors of the first image forming unit 16 and the second image forming unit 18 with each other, and may use an image forming unit having a larger remaining amount to perform image formation. Alternatively, the unit determination portion 112 compares remaining amounts of toner of only one designated color such as black (K) among the respective colors of the first image forming unit 16 and the second image forming unit 18, and may use an image forming unit having a larger remaining amount to perform image formation.

Step S1009 to Step S1011 are processes in a case where it is determined in step S1008 that a printing instruction is executed by using the first image forming unit 16. In step S1009, the input reception portion 106 converts the received printing instruction into printable image data such as a raster image on the basis of print data and processing commands included in the printing instruction and stores the image data in the first memory 80.

In step S1010, the printing instruction portion 114 of the first controller section 92 instructs the printing control portion 104 of the first unit control section 90 to start printing. The printing control portion 104 uses the first image forming unit 16 to form an image on the recording paper P according to the image data stored in the first memory 80. In this case, the printing control portion 104 controls an operation of each part of the paper feeding device 12, the transport device 14, the fixing device 20, and the discharge device 22, and performs a printing process.

In a case where printing has been completed, in step S1011, the printing instruction portion 130 of the first controller section 92 erases the printing instruction and the image data stored in the own first memory 80, and ends the process.

On the other hand, the processes in step S1012 to step S1017 are processes in a case where it is determined in step S1008 that a printing instruction is executed by using the second image forming unit 18. In step S1012, the input reception portion 106 transmits the printing instruction to the input reception portion 124 of the second controller section 96. The printing instruction portion 114 of the first controller section 92 instructs the printing control portion 104 of the second unit control section 94 to start printing.

In step S1013, the input reception portion 124 of the second controller section 96 converts the printing instruction received from the first controller section 92 into printable image data such as a raster image on the basis of print data and processing commands included in the printing instruction, and stores the image data in the second memory 88.

In step S1014, the printing instruction portion 130 of the second controller section 96 instructs the printing control portion 122 of the second unit control section 94 to start printing, and forms an image on the recording paper P according to the image data stored in the second memory 88 by using the second image forming unit 18.

At the time of image formation using the second image forming unit 18, in step S1015, the printing instruction portion 114 of the first controller section 92 instructs the printing control portion 104 of the first unit control section 90 to control the paper feeding device 12, the transport device 14, the fixing device 20, and the discharge device 22.

In a case where image formation has been ended, in step S1016, the printing instruction portion 130 of the second controller section 96 erases the printing instruction and the image data stored in the second memory 88. In step S1017, the printing instruction portion 130 of the second controller section 96 transmits information indicating that the image formation has been ended to the first controller section 92.

In step S1018, the printing instruction portion 130 of the first controller section 92 erases the printing instruction and the image data stored in the own first memory 80, and ends the process.

In the above exemplary embodiment, a case where the image forming apparatus 10 has two image forming units has been described, but three or more image forming units may be provided. In a case where the image forming apparatus 10 has three or more image forming units having image forming sections of identical colors and all the image forming units are in a state in which image formation cannot be executed, execution of a received printing instruction is temporarily suspended. In a case where any of the plurality of image forming units is in a state in which image formation can be executed, the suspended printing instruction may be executed by using an image forming unit which is first able to form an image.

In a case where the image forming apparatus 10 has three or more image forming units having image forming sections of identical colors and at least two or more image forming units are in a state in which image formation can be executed, a printing instruction may be executed by selecting an image forming unit having the largest remaining amount of consumables.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Supplementary Note (((1)))

An image forming apparatus comprising:

a plurality of image forming units including a plurality of image forming sections and an intermediate transfer body to which a toner image formed on the plurality of image forming sections is primarily transferred; and a processor, wherein the processor is configured to:

in a case where a printing instruction is received in a state in which an image forming section having a combination of identical colors is set for each of the plurality of image forming units, execute the printing instruction by using an image forming unit that is in a state in which image formation is able to be executed among the plurality of image forming units.

(((2)))

The image forming apparatus according to (((1))), wherein the processor is configured to:

in a case where the image forming unit for which the printing instruction is to be executed is in a state in which image formation is unable to be executed, execute the printing instruction for another image forming unit among the plurality of image forming units.

(((3)))

The image forming apparatus according to (((1))), wherein the processor is configured to:

in a case where at least two image forming units among the plurality of image forming units are in a state in which image formation is able to be executed, select an image forming unit having a largest remaining amount of a consumable among the image forming units that are in a state in which image formation is able to be executed and execute a printing instruction.

(((4)))

The image forming apparatus according to claim (((3))), wherein the consumable is toner used for forming a toner image in the plurality of image forming sections.

(((5)))

The image forming apparatus according to (((1))), wherein the processor is configured to:

in a case where all of the plurality of image forming units are in a state in which image formation is unable to be executed, suspend execution of a received printing instruction; and in a case where any of the plurality of image forming units is in a state in which image formation is able to be executed, execute a suspended printing instruction for an image forming unit that is first able to execute image formation.

(((6)))

The image forming apparatus according to (((5))), further comprising:

a plurality of control sections that respectively control the plurality of image forming units, wherein the processor is configured to:

in a case where execution of the received printing instruction is suspended, control each of the plurality of control sections to execute a process of converting the received printing instruction into a raster image; and in a case where any of the plurality of image forming units is in a state in which image formation is able to be executed, execute the suspended printing instruction by using a raster image converted in a control section provided to correspond to the image forming unit that is first able to execute image formation.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a plurality of image forming units, wherein each of the plurality of image forming units includes a plurality of image forming sections and an intermediate transfer body to which a toner image formed on the plurality of image forming sections is primarily transferred;

a plurality of control sections that respectively control the plurality of image forming units; and a processor, wherein the processor is configured to:

in a case where a printing instruction is received in a state in which each of the plurality of image forming units respectively includes an image forming section having a combination of identical colors, execute the printing instruction by using an image forming unit that is in a state in which image formation is able to be executed among the plurality of image forming units;

in a case where all of the plurality of image forming units are in a state in which image formation is unable to be executed, suspend execution of a received printing instruction and control each of the plurality of control sections to execute a process of converting the received printing instruction into printable image data; and in a case where any of the plurality of image forming units is in a state in which image formation is able to be executed, execute the suspended printing instruction by using the printable image data converted in a control section provided to correspond to the image forming unit that is first able to execute image formation.

2. The image forming apparatus according to claim 1, wherein the processor is configured to:

in a case where the image forming unit for which the printing instruction is to be executed is in a state in which image formation is unable to be executed, execute the printing instruction for another image forming unit among the plurality of image forming units.

3. The image forming apparatus according to claim 1, wherein the processor is configured to:

in a case where at least two image forming units among the plurality of image forming units are in a state in which image formation is able to be executed, select an image forming unit having a largest remaining amount of a consumable among the image forming units that are in a state in which image formation is able to be executed and execute a printing instruction.

4. The image forming apparatus according to claim 3, wherein the consumable is toner used for forming a toner image in the plurality of image forming sections.

5. The image forming apparatus according to claim 1, wherein the printable image data is a raster image.

6. A non-transitory computer readable medium storing an image forming program causing a computer to execute a process, the process comprising:

executing, in a case where a printing instruction is received in a state in which each of a plurality of image forming units respectively includes a plurality of image forming sections and respectively includes an image forming section having a combination of identical colors, the printing instruction by using an image forming unit that is in a state in which image formation is able to be executed among the plurality of image forming units;

in a case where all of the plurality of image forming units are in a state in which image formation is unable to be executed, suspending execution of a received printing instruction and controlling each of a plurality of control sections to execute a process of converting the received printing instruction into printable image data, wherein the plurality of control sections respectively control the plurality of image forming units; and in a case where any of the plurality of image forming units is in a state in which image formation is able to be executed, executing the suspended printing instruction by using the printable image data converted in a control section provided to correspond to the image forming unit that is first able to execute image formation.

7. An image forming apparatus comprising:

a plurality of image forming means, wherein each of the plurality of image forming means includes a plurality of image forming sections and an intermediate transfer body to which a toner image formed on the plurality of image forming sections is primarily transferred;

a plurality of control means that respectively control the plurality of image forming means; and means for executing, in a case where a printing instruction is received in a state in which each of a plurality of image forming means respectively includes an image forming section having a combination of identical colors, the printing instruction by using an image forming means that is in a state in which image formation is able to be executed among the plurality of image forming means;

means for, in a case where all of the plurality of image forming means are in a state in which image formation is unable to be executed, suspending execution of a received printing instruction and controlling each of a plurality of control means to execute a process of converting the received printing instruction into printable image data; and means for, in a case where any of the plurality of image forming means is in a state in which image formation is able to be executed, executing the suspended printing instruction by using the printable image data converted in a control section provided to correspond to the image forming mean that is first able to execute image formation.

* * * * *